May 22, 1951 W. A. FULLER 2,553,573

MAGNETIC PHONOGRAPH PICKUP HAVING AN ARMATURE SUPPORT WITHIN THE PICKUP COIL

Filed April 30, 1947

INVENTOR
WENDELL A. FULLER
BY Arthur A. Smith
ATTORNEY

Patented May 22, 1951 2,553,573

UNITED STATES PATENT OFFICE 2,553,573

MAGNETIC PHONOGRAPH PICKUP HAVING AN ARMATURE SUPPORT WITHIN THE PICKUP COIL

Wendell A. Fuller, Marion, Ind., assignor, by mesne assignments, to Farnsworth Research Corporation, a corporation of Indiana Application April 30, 1947, Serial No. 744,930

3 Claims. (Cl. 179—100.41)

This invention relates in general to phonograph pickup devices and more particularly it relates to electromagnetic phonograph pickups of the movable armature type.

Vibratory pickup devices employed for phonographic purposes are generally of the piezoelectric or the electromagnetic type. The crystal pickup is comparatively light in weight but as it is easily damaged frequent replacements are necessary. Another disadvantage is that humid atmospheric conditions and reduced ambient temperatures also render a crystal pickup inoperative.

The magnetic type of pickup is relatively heavy and many efforts have been made to reduce its weight to thereby decrease the pressure exerted by the stylus upon the record groove. For example, it is conventional to balance the tone arm or to reduce the size and weight of the magnets and pickup coils. These expedients, however, usually result in the stylus having a tendency to jump from the record groove or there is a reduction of the voltage output and the frequency response of the device.

Many of the conventional pickups cannot easily be restricted to responding only to the lateral vibration of the stylus, but are also affected by longitudinal vibration. This action is undesirable in the reproduction of a laterally embossed record because of the distortion of the generated signal. Conventional crystal and magnetic pickups also generate a relatively high degree of chatter and needle talk. These pickups also have inherent resonant characteristics which tend to adversely affect the quality of reproduction.

Therefore, it is an object of the present invention to provide an improved magnetic pickup of simple and rugged construction and which is relatively impervious to impact.

A further object of the present invention is to provide a magnetic pickup device having a relatively high signal output and frequency response.

Another object of the present invention is to provide, in a magnetic pickup, an armature having negligible mass thereby faithfully to track a record groove throughout a wide range of audio frequencies.

A still further object of the present invention is to provide a magnetic pickup having a balanced armature of low inertia arranged to be readily responsive to lateral vibrations and nonresponsive to longitudinal vibrations whereby signal distortion is held to a minimum.

In accordance with the present invention, there is provided an electromagnetic pickup comprising a permanent magnet having pole pieces arranged thereon which are adapted to support a pickup coil. A first rubber sleeve is concentrically arranged within said pickup coil whereby to support a tubular armature in spaced relation to the pole pieces and to permit freedom of lateral movement therein. Another rubber sleeve is arranged within the tubular armature to support a stylus and to transmit vibrations of the stylus to the armature.

For a better understanding of the invention, together with other and further objects thereof, reference is made to the following description, taken in connection with the accompanying drawing, and its scope will be pointed out in the appended claims.

Figure 1:
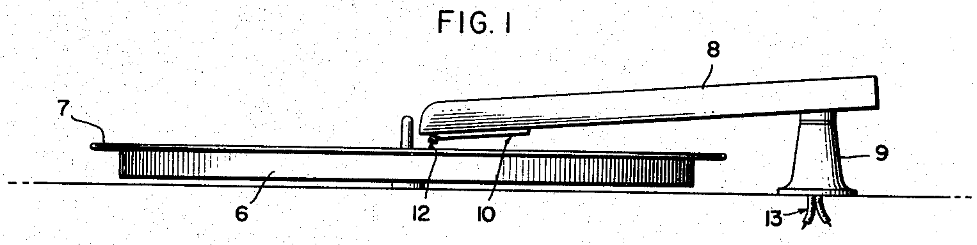
Fig. 1 shows a phonograph having a tone arm which embodies the magnetic pickup of the present invention.

Referring now to Fig. 1 of the drawing, there is shown a conventional arrangement of a turntable 6 upon which is mounted a phonograph record 7. A tone arm 8 is pivotally mounted at one end on tone arm support 9 whereas the other end is adapted to contain a pickup 10. The pickup 10 includes a stylus 12 which is arranged to track the sound groove of the record 7. The turntable 6 may be driven by any suitable means, such as an electric motor, not shown, whereby the rotation of the record will cause the embossed sound groove of the record to impart a vibratory motion to the stylus 12. This vibratory motion is translated by the pickup 10 into a signal voltage which may be applied by conductors 13 to an appropriate amplifying and reproducing system.

Figure 2:
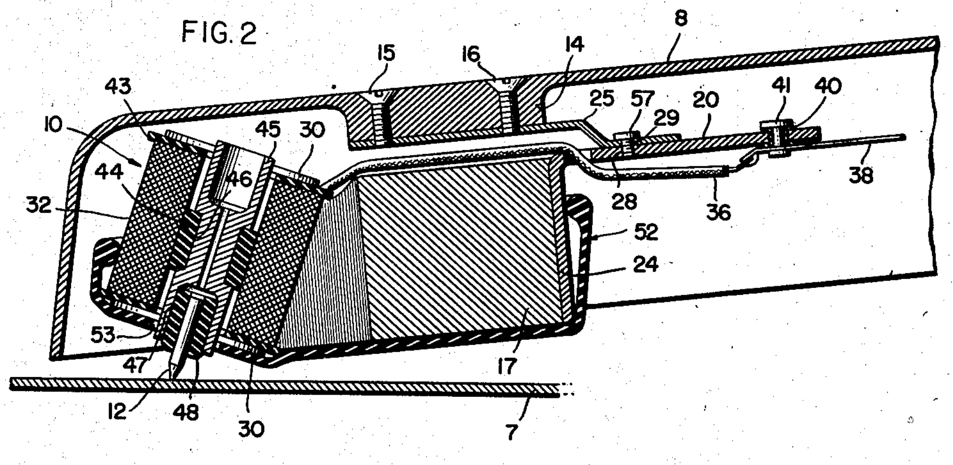
Fig. 2 is an enlarged sectional view of the tone arm showing the magnetic pickup of the present invention.
Figure 3:
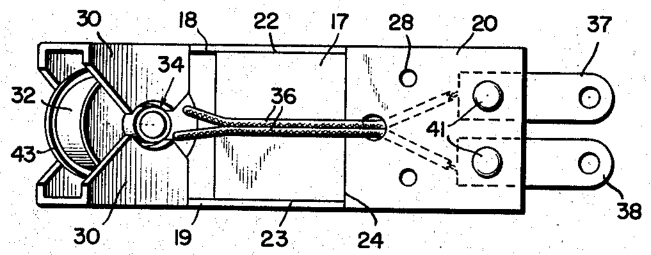
Fig. 3 is a top plan view of the magnetic pickup.

Reference is now had jointly to Fig. 2 and Fig. 3 of the drawing. For the purpose of mounting the pickup head 10 to the upper wall of the tone arm 8, there is provided a mounting boss 14 which contains suitable apertures therein to receive the mounting screws 15 and 16. The magnetic pickup structure consists of a metallic supporting frame comprising a centrally located magnet block 17, a pair of pole piece members 18 and 19 and a terminal plate 20. The magnet block 17 comprises side surfaces 22 and 23, which are employed for supporting the pole piece members 18 and 19 respectively, whereas a rear face 24 serves to mount the terminal plate 20. The magnet block 17 is preferably fabricated of a metallic alloy having high magnetic characteristics such, for example, as an alloy having approximately the following composition: aluminum, 8 per cent; nickel, 14 per cent; cobalt, 24 per cent; copper, 3 per cent; iron, 51 per cent. A suitable form of this alloy is available under the trade-name of Alnico #5. The pole piece members 18 and 19 are formed of soft iron and are affixed to the side walls 22 and 23 respectively of the magnetic block 17 by silver solder or other suitable means. The terminal plate 20, also of soft iron, is right-angular in form and is affixed to the rear face 24 of the magnet block 17 also by silver solder or other appropriate means. The terminal plate 20 serves the dual purpose of providing a mounting arrangement whereby the pickup 10 may be affixed to the tone arm 8 and at the same time serves to provide connective terminal mounting means for the signal output conductors. The terminal plate 20 is affixed to a mounting plate 25 by screws, such as screw 57, which are seated in threaded holes 28 and 29 in the terminal plate 20 and mounting plate 25. The mounting plate 25 is then held by the screws 15 and 16 against the under surface of the mounting boss 14.

As shown in Fig. 3, the pole piece members 18 and 19 extend laterally and angularly from the magnet block 17 and are provided with ears, such as ear 30, which are bent inwardly to form spaced members. The extremity of each ear has a convex cutout portion whereby a substantially circular air gap 34 is formed. A pickup coil 32 is supported between the pole pieces by sealing means such as wax or cement. Referring now to the coil winding, the specifications employed in one modification thereof include a coil having a circular air core of three-sixteenths of an inch in diameter and having wound thereon approximately 7,000 turns of No. 46 single enamel covered wire. The coil 32 is provided with conductor pair 36, which is connected to the winding and lugs 37 and 38 on the terminal plate 20. These lugs are insulated from the terminal plate 20 by proper insulating means such as washer 40, and are fastened thereon by means such as rivet 41.

The coil 32 is wound on an insulating spool form 43 to form the center air core. A resilient sleeve 44, of rubber, for example, is cemented or otherwise fixed to the coil within the air core equidistant from each end of the coil 32 and is adapted to support a balanced tubular armature 45 in concentric magnetic relation with the coil winding 32 and the pole piece faces at the air gap 34.

The armature 45 is fabricated of soft iron, is substantially tubular in form, and is formed to provide at the central portion thereof an annular recess 46 which is adapted to provide a retaining seat for the rubber sleeve 44. The armature 45 is adapted to extend through and beyond the upper and lower portions of the coil 32 into operative relationship with the pole pieces 18 and 19. The armature 45 is recessed at 47 to provide a support for a resilient stylus seat 48 which is tubular in form and preferably of rubber composition whereby it may be frictionally retained within the armature. The stylus 12 is inserted in the stylus seat 48 and projects therefrom at an angle appropriate for the proper engagement with the sound groove of the record 7.

The lateral movement of the stylus 12 is transmitted to the armature 45 which is arranged to pivot at substantially its center point in sleeve 44. It will be understandable that as the lower portion of the armature 45 approaches the lower pole piece, the upper extremity of the armature is caused to approach the opposite pole piece. Thus, the air gap 34 is varied. Since the armature 45 is suspended in a relatively strong magnetic field movement thereof by the stylus 12 will cause the coil 32 to generate currents which are representative of the embossed sound track.

Longitudinal vibration of the stylus 12 and the armature 45 is restricted by the rubber sleeve 44 due to the internal longitudinal resistance thereof. Sleeve 44 is preferably fabricated of a natural or synthetic rubber having relatively high characteristics of resilience. With respect to restricting the lateral movement of the armature 45 the sleeve 44 should be of sufficient density and stiffness to restrain the armature 45 from touching the pole pieces at the limits of its oscillation, yet at the same time, the characteristic of the rubber employed should offer a negligible damping effect to low frequency vibrations. It has been found that a suitable rubber for this purpose will have a controlled durometer reading of approximately 20.

With respect to the stylus seat 48, also of rubber composition, a different situation exists wherein it is preferable that the stylus seat rubber be relatively hard. Otherwise, the response of the armature 45 to the high frequency vibrations of the stylus 12 will be cut off at a lower frequency than is desirable. It has been found that a satisfactory rubber composition for the stylus seat 48 will have a controlled durometer reading of approximately 80.

For the purpose of preventing the collection of magnetically attracted particles, and the like, which may be caused by the high value of magnetism of the block 17 and the pole pieces 18 and 19, there is provided a protective cover 52. The cover 52 is a form fitting soft rubber shield, covering the entire lower portion of the pickup 10, and having an aperture 53 arranged therein whereby the lower extremity of the armature 45 and the stylus 12 may project therefrom. The aperture 53 is substantially the same diameter as the armature 48 and the rubber cover 52 should have the required resilience to contact armature 45 at all times whereby magnetic particles are prevented from entering the air core 34 and the movement of the armature is substantially in no way restricted.

The signal output of the pickup 10 has been connected to audio input circuits having input impedance values ranging from 10 K ohms to .5 megohm whereby, with proper audio equalizing networks there was substantially no attenuation either in the signal voltage output or the frequency response of the device over this range of input impedances. It has been found that this magnetic pickup delivers an output signal voltage of the order of 1.3 volts as compared to the prior type magnetic devices which deliver an average of .5 volt and the crystal devices which usually render a 1.5 volt signal. The overall weight of pickup embodied in the present invention is substantially less than the prior art magnetic types and has been found to approach within one-half ounce of the average weight of the crystal devices. It will be evident therefore from the foregoing description that the pickup of the present invention is in many respects superior to or comparable with the devices presently employed and may be readily interchanged therewith.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A phonograph pickup armature mounting comprising a pickup coil, a resilient tubular member fixed within said coil, a cylindrical armature in frictional engagement at its midsection with said resilient tubular member, said armature having shoulders extending radially outwardly over the ends of said resilient member, a resilient tubular stylus mounting member in one end of said tubular armature and a stylus in frictional engagement with said resilient stylus mounting member.

2. A phonograph pickup comprising a magnet, pole pieces extending therefrom and including pole faces disposed opposite one another to form a pair of air gaps, a pickup coil disposed between said pole pieces, a resilient member fixed within said coil, an armature in frictional engagement at its midsection with said resilient member and extending into said air gaps, said armature having portions extending over and in contact with the ends of said resilient member, a resilient tubular stylus mounting member in said armature and a stylus in frictional engagement with said resilient stylus mounting member.

3. A phonograph pickup comprising a magnet, pole pieces extending therefrom, each pole piece including a pair of parallel extensions having arcuate pole faces, the pole faces of one of said pairs being disposed opposite the pole faces of the other of said pairs to form a pair of substantially circular air gaps, a pickup coil disposed between said pairs of extensions, a resilient tubular member fixed within said coil, a tubular armature in frictional engagement at its midsection with said resilient tubular member and extending into said circular air gaps, said armature having shoulders extending radially outwardly over the ends of said resilient member, a resilient tubular stylus mounting member in said tubular armature and a stylus in frictional engagement with said resilient stylus mounting member.

WENDELL A. FULLER.

REFERENCES CITED

The following references are of record in the file of this patent:

UNITED STATES PATENTS

| Number | Name | Date |
|---|---|---|
| 1,504,433 | Corswandt | Aug. 12, 1924 |
| 1,667,021 | Williamson | Apr. 24, 1928 |
| 1,760,647 | Hopkins | May 27, 1930 |
| 1,834,359 | Vansickle | Dec. 1, 1931 |
| 1,835,072 | McClatchie | Dec. 8, 1931 |
| 2,249,713 | Imelmann | July 15, 1941 |
| 2,410,607 | Moore | Nov. 5, 1946 |
| 2,415,681 | Faus | Feb. 11, 1947 |

FOREIGN PATENTS

| Number | Country | Date |
|---|---|---|
| 276,466 | Great Britain | Sept. 1, 1947 |